July 8, 1930. G. R. ISBELL 1,770,105
CALENDAR
Filed July 25, 1929
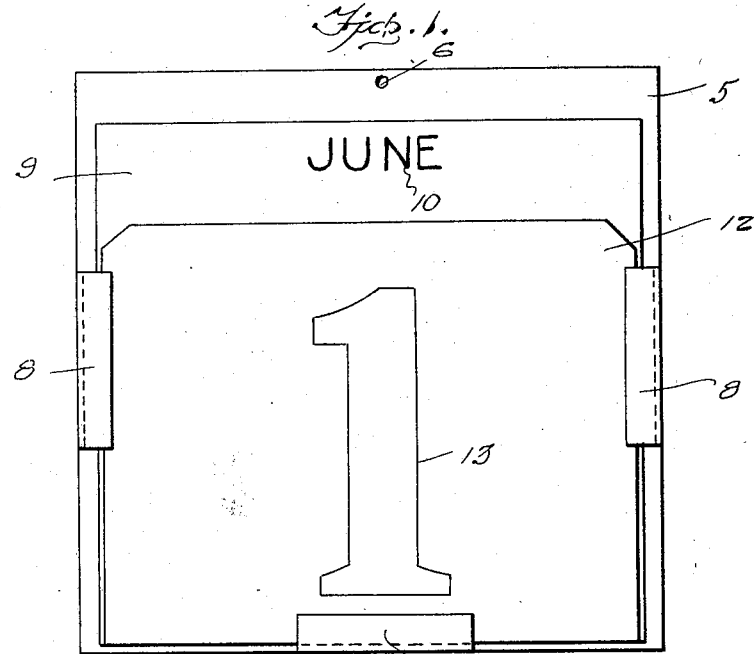
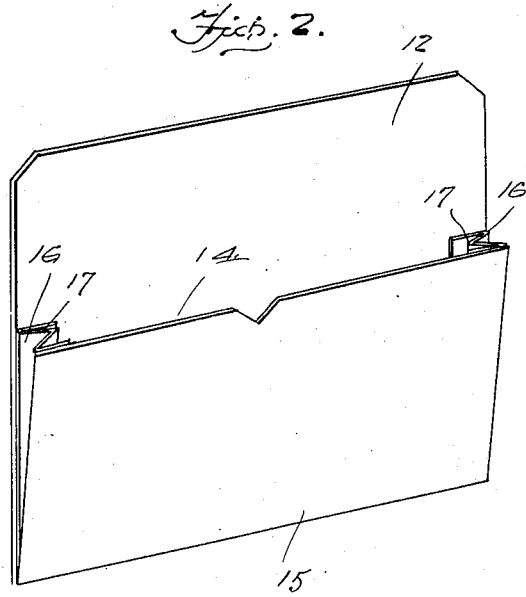
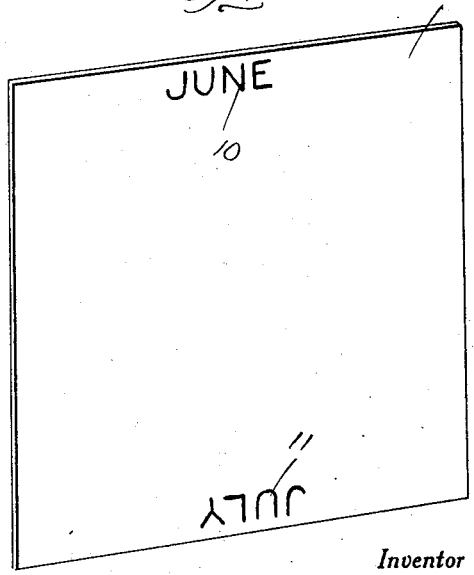
Inventor
Gordon R. Isbell
By Clarence A. O'Brien
Attorney July 8, 1930.  C. J. A. JOHNSON  1,770,106
PLANING MACHINE PROVIDED WITH FIXED KNIVES DRAWERS
Filed June 20, 1927